March 3, 1959  B. E. COLBURN  2,875,642
DETACHABLE ELECTRIC MOTOR SHAFT SHIELD
Filed Feb. 5, 1958
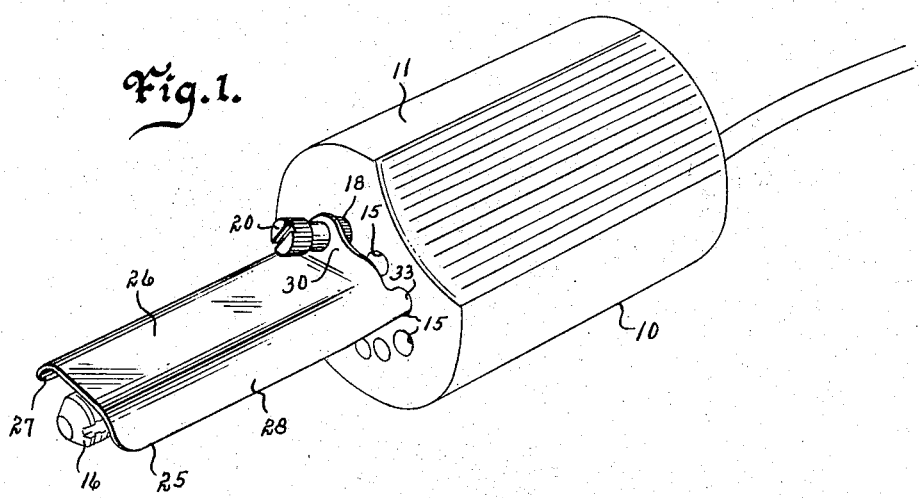
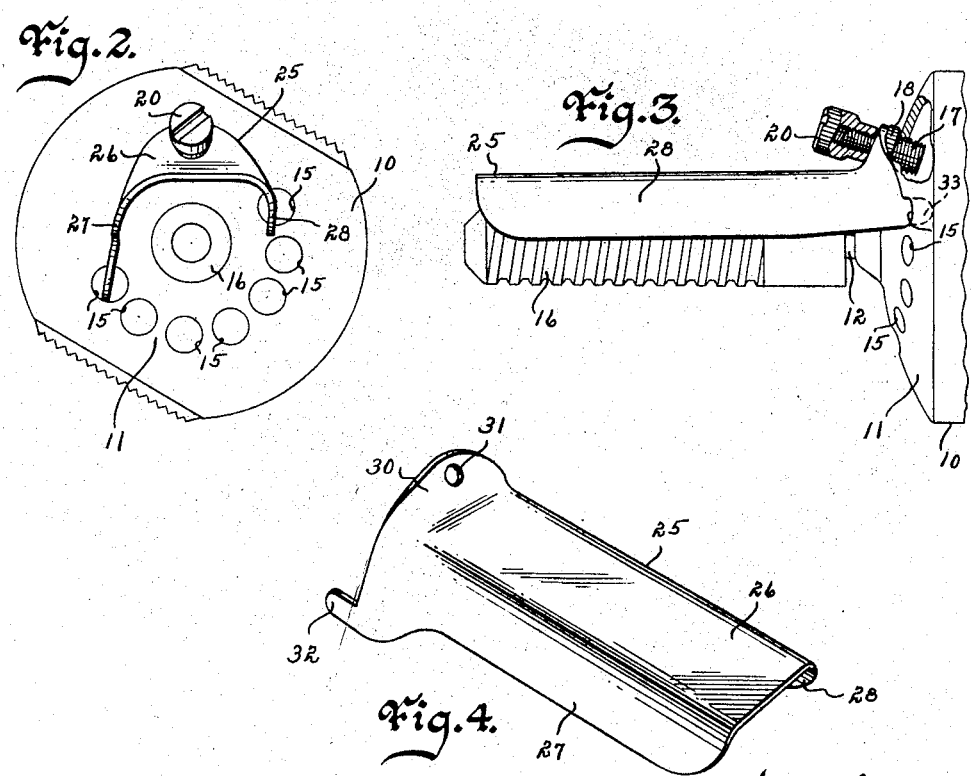
Witness
Edward P. Seeley
Inventor
Bearl E. Colburn
by M. Talbert Dick
Attorney

United States Patent Office 2,875,642
Patented Mar. 3, 1959

2,875,642

DETACHABLE ELECTRIC MOTOR SHAFT SHIELD

Bearl E. Colburn, Green Bay, Wis., assignor to Homeward Products Incorporated, Des Moines, Iowa, a corporation of Wisconsin Application February 5, 1958, Serial No. 713,428

5 Claims. (Cl. 74—609)

This invention relates to a detachable shield for the rotataing shaft of electric motors.

Electric motors are universally used in performing many tasks, such as powering fish scalers, drilling bits, grinders, and like. In many instances, such tools are an extension of a part of the motor shaft unit. Obviously, shields are often necessary for the purpose of safety to baffle flying particles from the operator, and like. An example of shield requirement is that of motorized fish scalers. The shield not only prevents the user from accidentally coming in contact with the fast rotating scaler, but prevents the severed scales from flying in all directions. While the shield does serve its intended purpose while in use, it must be removed in order that the scaling tool can be washed and cleaned after usage. Thus, each time the tool is used, the shield must be removed once, and replaced once. Herebefore, a permanent bracket has been bolted to the motor housing and the shield detachably secured to the bracket. The objection to such a means is that the motor must be taken apart in order to bolt the bracket to the motor housing, and the permanently installed bracket, even when the shield is removed, partially interferes with the cleaning or servicing of the tool.

Therefore, one of the principal objects of my invention is to provide a one piece shield without bracket support that may be easily and quickly installed on or removed from an electric motor housing.

A further object of this invention is to provide a shaft shield for electric motors that does not require the removal of the motor housing for original installation.

A still further object of this invention is to provide an electric motor shaft shield that is held in place by a single threaded member.

Still further objects of my invention are to provide an electric motor shaft shield that is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a perspective view of my shield installed onto the housing of an electric motor;

Fig. 2 is an enlarged front end view of my installed shield and more fully illustrates its construction;

Fig. 3 is an enlarged front end view of my installed shield; and

Fig. 4 is an enlarged perspective view of my shaft shield detached from an electric motor housing.

In these drawings, I have used the numeral 10 to generally designate an ordinary electric motor having the usual housing 11. The numeral 12 designates the motor's drive shaft extending through and from the housing. Substantially, all electric motors of this type have a plurality of evenly spaced apart ventilating holes 15 through the housing 11. These holes 15 form a continuous circular path around the point where the shaft 12 exits from the housing, as shown in Fig. 2. The numeral 16 designates a tool such as a fish scaler on the shaft 12. It is to such a device that I install my shield and which I will now describe in detail. First, I thread a threaded stub shaft 17 into one of the holes 15, as shown in Fig. 3. The numeral 18 designates a lock nut threaded onto the stub shaft 17 and in engagement with the outer side of the motor housing. The numeral 20 designates a detachable nut on the outer end area of the threaded stub shaft 17.

The numeral 25 generally designates my shield and which is in the general form of an inverted elongated trough having a top area 26, and two sides 27 and 28, as shown in Fig. 4. The rear end portion of the top portion 26 is bent upwardly and outwardly to provide a flange portion 30. This portion 30 has a hole 31 adapted to detachably embrace the threaded stub shaft 17. The rear end portion of the side 27 is extended into a rearwardly extending finger 32. The rear end portion of the side 28 is extended into a rearwardly extending finger 33. These two fingers 32 and 33 are adapted to extend into two ventilation holes 15, respectively, of the motor housing. To install my shield, it is merely necessary to place the flange portion 30 onto the motor housing with the stub shaft 17 extending through the hole 31 and with the two fingers 32 and 33 of the shield extending into the two holes 15 of the motor housing. By screwing the nut 20 onto the stub shaft 17 and tightening the same onto the flange 30, the hood shield will be rigidly detachably secured to the motor and its length will loosely embrace the motor shaft and tool, as shown in Fig. 2. The shield will be held from accidental rotation by the two fingers extending into the two ventilating holes of the motor housing. While the structure is most rigid, it will be noted that the device is retained onto the motor by virtue of the single nut 20. To remove the shield, the nut 20 is removed and the shield may then be completely detached by merely moving it forwardly from the motor.

In scaling a fish my shield is held closely adjacent the fish and, in fact, the side 28 may be placed in direct contact with the fish, first to hold the fish down during the scaling operation, and secondly to retain as much as possible the flying severed scales. Inasmuch as the bottom edge of the side 28 engages and slides over the scales of the fish, it should be curved slightly inwardly, as shown in Fig. 2, thus preventing this bottom edge of the side 28 from catching on and under the scales of the fish.

Some changes may be made in the construction and arrangement of my detachable electric motor shaft shield without departing from the real spirit and purpose of my invention, and it is my intention to cover by my claims, any modified forms of structure or use of mechanical equivalents which may be reasonably included within their scope.

I claim:

1. In combination, an electric motor having a housing, a drive shaft unit extending from said housing, and a plurality of ventilating passageways extending through said housing and adjacent said drive shaft unit, and a hood shield means for said drive shaft unit, comprising, an elongated shield member having a holed flange at its rear portion, a bolt means extending through the hole in said flange and one of the ventilating passageways of the housing of said motor, and at least one finger projection on said shield extending into another of the ventilating passageways of said housing.

2. In combination, an electric motor having a housing, a drive shaft unit extending from said housing, and a plurality of ventilating passageways extending through said housing and adjacent said drive shaft unit, and a hood shield means for said drive shaft unit, comprising, an elongated shield member having a holed flange at its rear portion, a bolt means extending through the hole in said flange and threaded into one of the ventilating passageways of the housing of said motor, and at least one finger projection on said shield extending into another of the ventilating passageways of said housing.

3. In combination, an electric motor having a housing, a drive shaft unit extending from said housing, and a plurality of ventilating passageways extending through said housing and adjacent said drive shaft unit, and a hood shield means for said drive shaft unit, comprising, an elongated shield member curved in cross section, having a holed flange at its rear portion, a bolt means extending through the hole in said flange and one of the ventilating passageways of the housing of said motor, and two rearwardly extending fingers on said shield each detachably extending into one of the ventilating passageways of the housing of said motor.

4. In combination, an electric motor having a housing, a drive shaft unit extending from said housing, and a plurality of ventilating passageways extending through said housing and adjacent said drive shaft unit, and a hood shield means for said drive shaft unit, comprising, an elongated shield member curved in cross section, having a holed flange at its rear portion, a bolt means extending through the hole in said flange and one of the ventilating passageways of the housing of said motor, and two rearwardly extending fingers on said shield each detachably extending into one of the ventilating passageways of the housing of said motor; said two fingers being positioned at each side, respectively, of said bolt means.

5. In combination, an electric motor having a housing, a drive shaft unit extending from said housing, and a plurality of ventilating passageways extending through said housing and adjacent said drive shaft unit, and a hood shield means for said drive shaft unit, comprising, an elongated shield member curved in cross section, having a holed flange at its rear portion, a bolt means extending through the hole in said flange and one of the ventilating passageways of the housing of said motor, and two rearwardly extending fingers on said shield each detachably extending into one of the ventilating passageways of the housing of said motor; said shield being of one piece and detachably held to said housing solely by said single bolt means, and having one of its side edges curved inwardly.

References Cited in the file of this patent

UNITED STATES PATENTS

| | | |
|---|---|---|
| 1,324,581 | Boesch | Dec. 9, 1919 |
| 1,758,675 | Reilly | May 13, 1930 |
| 1,982,083 | Strand | Nov. 27, 1934 |
| 1,982,084 | Strand | Nov. 27, 1934 |
| 2,481,182 | Waters | Sept. 6, 1949 |
| 2,505,588 | Smith | Apr. 25, 1950 |
| 2,557,272 | Gabriel | June 19, 1951 |
| 2,598,509 | Corbin | May 27, 1952 |
| 2,750,142 | McKee | June 12, 1956 |
| 2,835,919 | Colburn et al. | May 27, 1958 |

FOREIGN PATENTS

| | | |
|---|---|---|
| 478,227 | Canada | Nov. 6, 1951 |
| 150,128 | Australia | May 10, 1951 |